United States Patent [19]

Burgin

[11] E Re. 28,731

[45] Reissued Mar. 9, 1976

[54] APPARATUS FOR DISPENSING BANK NOTES

[76] Inventor: Gerard Burgin, 6, rue de la Thur, Kingersheim, France

[22] Filed: Aug. 25, 1975

[21] Appl. No.: 607,434

Related U.S. Patent Documents

Reissue of:

[64] Patent No.: 3,877,559
Issued: Apr. 15, 1975
Appl. No.: 328,936
Filed: Feb. 2, 1973

[30] Foreign Application Priority Data

Feb. 4, 1972 Switzerland ..... 1636/72

[52] U.S. Cl. ..... 194/4 G; 194/DIG. 26; 271/20; 235/61.7 R

[51] Int. Cl.[2] ..... G07F 11/00

[58] Field of Search ..... 194/4 G, 4 R, DIG. 26; 271/94, 99, 20, 23; 235/61.11 E, 61.7 R, 61.7 A, 61.7 B

[56] References Cited

UNITED STATES PATENTS

| | | | |
|---|---|---|---|
| 1,458,462 | 6/1923 | Braunstein | 271/20 |
| 2,033,849 | 3/1936 | Mudd | 271/94 |
| 2,524,417 | 10/1950 | Bamber | 271/23 UX |
| 3,163,414 | 12/1964 | Lingenbrink | 271/99 X |
| 3,570,643 | 3/1971 | Maierhofer | 194/DIG. 26 |
| 3,588,449 | 6/1971 | Paterson | 194/DIG. 26 |
| 3,643,216 | 2/1972 | Greenaway et al. | 194/DIG. 26 |
| 3,657,521 | 4/1972 | Coustable | 194/DIG. 26 |
| 3,675,816 | 7/1972 | Bourke et al. | 194/DIG. 26 |

*Primary Examiner*—Robert B. Reeves
*Assistant Examiner*—Joseph J. Rolla
*Attorney, Agent, or Firm*—Kinzer, Plyer, Dorn & McEachran

[57] ABSTRACT

Apparatus for dispensing bank notes, of the type operating with a bank identity card. This apparatus requires the simultaneous utilization of a bank identity card and of a cheque the amount of which corresponds to the sum requested. It comprises rotary reading heads for verifying the authenticity and the nonfalsification of the card or cheque, as well as a combined verification device for verifying the correspondence between the card and the cheque for controlling the dispensing of notes.

10 Claims, 17 Drawing Figures

471
472
C
47"
47'
47
C
48
49
48
4
47
46
47
46
47
46

102
41
42
43
1

Fig. 6A
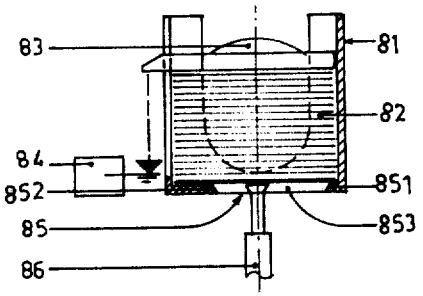
Fig. 6B
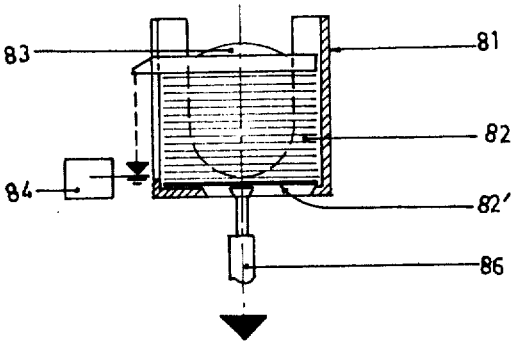
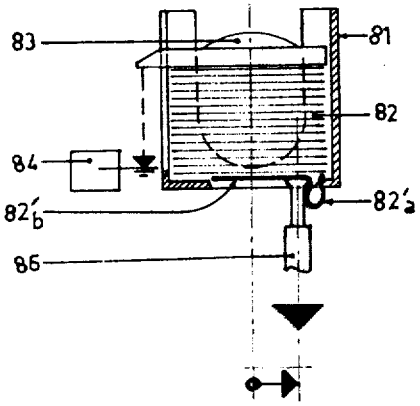
Fig. 6C
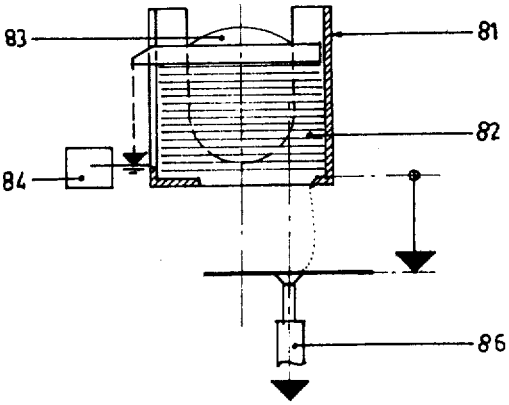
Fig. 6D
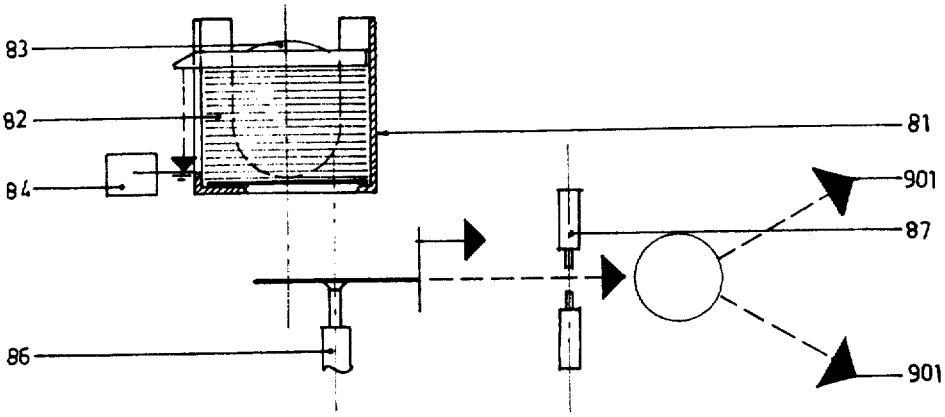
Fig. 6E

APPARATUS FOR DISPENSING BANK NOTES

Matter enclosed in heavy brackets [ ] appears in the original patent but forms no part of this reissue specification; matter printed in italics indicates the additions made by reissue.

The present invention relates to an apparatus for dispensing bank notes on presentation of a bank identity card.

Various dispensers of bank notes are already known but all these have a certain number of disadvantages relating to numerous operating error possibilities, fraud, the impossibility of dispensing bank notes in a simple manner and, in general, the impossibility of operating under conditions of maximum security which is essential both for the bank and the customer.

The object of the present invention is to provide an apparatus for the rational dispensing of bank notes and which enables a defined number of notes to be dispensed to the user, and which is accessible 24 hours out of 24, so as to reduce the utilization of bank cheques for small amounts, and, in consequence, eliminate all the accounting work related to such mode of payment by cheque.

The invention intends to provide a device which will allow operation with a maximum degree of security and prevent falsification of bank documents, both by the user and the personnel having access to the distributor.

To this end, the present invention relates to an apparatus for dispensing bank notes, of the type that operates with a bank identity card, the apparatus being characterized in that it requires the simultaneous use of a bank identity card and a cheque the amount of which corresponds to the sum requested, and it comprises means of verifying the authenticity and the non-falsification of the card and the cheque, as well as the means for verifying the agreement between the card and the cheque in order to control the note dispensing operation.

The fact that it is necessary to use a bank identity card and a cheque corresponding to the card in combination considerably reduces the risks of falsification or theft. Thus, a card which has been lost, cannot be used, except in combination with the corresponding cheque. This halves the risk of fraud.

In the same way, verification of authenticity and correspondence prevents and falsification of the cheque or the card.

This dispensing apparatus also provides considerable security for the bank which uses it. Thus the bank could provide a facility for dispensing bank notes which combines an identity card and cheques for the withdrawal of money, corresponding for example to a defined amount, uniform for all users or personnalized according to the user. These various restrictions or authorisations can be displayed on the cheque.

To simplify the operation of the apparatus for dispensing notes and to adapt it for processing documents such as cheques, which are made of paper and do not have the rigidity of cardboard or of a card made of synthetic material, it is of particular advantage to process the cheque in a vertical position, edgewise. To simplify the dispensing apparatus according to the invention, provision is also made for the processing of cards, which can be rigid, in a vertical position, edgewise.

Apart from the convenience as regards routing, there is also the advantage that the card and the cheques can be positioned with great precision, which is a condition required for establishing very strict control criteria for verifying authenticity and correspondence between the cheque and the card.

Given that the card and the cheque are processed in parallel, it is of particular advantage for the means for verifying these two documents to be mounted on a drum, to enable first the card and then the cheque to be verified by a simple pivoting movement about the axle.

According to a particular feature of the invention, the dispensing apparatus consists of an area for introducing the card and the cheque as well as an area for dispensing the notes of a device for verifying the cards and the cheques, connected to a card retention area and an area for the confiscation of defective or erroneous cheques, and of a storage area for receiving cheques that have been validly processed in the apparatus, these various input areas being connected to a logic control means, which itself controls the operation of the note dispenser and of the ticket dispenser, in the event of the malfunctioning of the dispenser.

According to another characteristic feature of the invention, the input area and the output area comprise means of protection provided with inlet and outlet slots for items (card, cheque, note, ticket) which can be obturated selectively by an obturator which is controlled and does not free more than one slot at a time.

The device for verifying cards and cheques is an essential element of the dispensing apparatus according to the invention. The verification device, according to the invention, comprises a means of introducing and transferring an item (card, cheque) in a vertical position, edgewise, such as transfer rollers, a positioning device for positioning the item with a view to it being read, this positioning device comprising positioning rollers, turning about a fixed axle and on which rests the item to be treated and processed (card, cheque) as well as abutments for the other side of the element, the side not being parallel to the side serving as a support for the item on the positioning rollers as well as verification means, of which the reading position corresponds to the position fixed by the positioning device.

To ensure correct functioning, it is particularly important that the dispensing apparatus dispenses only the correct number of notes, and that all malfunctioning is reported.

To this end, the bank note dispenser comprises a receptacle containing a stack of notes to be dispensed as well as an extractor which fixes itself by suction onto the bottom or top note of the stack, this extractor subjecting the note that has been sized to a translatory movement with respect to the other notes in the stack, and to separate it from the stack and form a loop, and then extract the note and convey it to the output station.

The extraction operation in this note dispenser can be effected ither from the top or from the bottom. However, according to the invention, it is more advantageous to extract it from the bottom. The extractor can be either a suction head executing a translatory movement in a vertical direction or a horizontal direction or a suction head executing a rotary movement. This last alternative has the advantage that its construction is simpler than the first.

Thus, in general, the apparatus for dispensing bank notes, according to the invention, satisfies all the security criteria required to enable the bank notes to be dispensed in public places, not necessarily inside banks, and at any moment of the day. This dispensing apparatus protects both the organisation dispensing the notes, against all kinds of theft or fraud as well as the user against theft or loss of the bank identity card or the theft of his cheques.

The present invention will be described in greater detail with the aid of a mode of construction represented schematically in the accompanying drawings in which:

FIG. 3 is a front view corresponding to FIG. 2;

FIGS. 6A–6D are schematic views of the dispenser in various phases of operation;

FIG. 6E shows the transport of a dispensed note;

Figure 1:
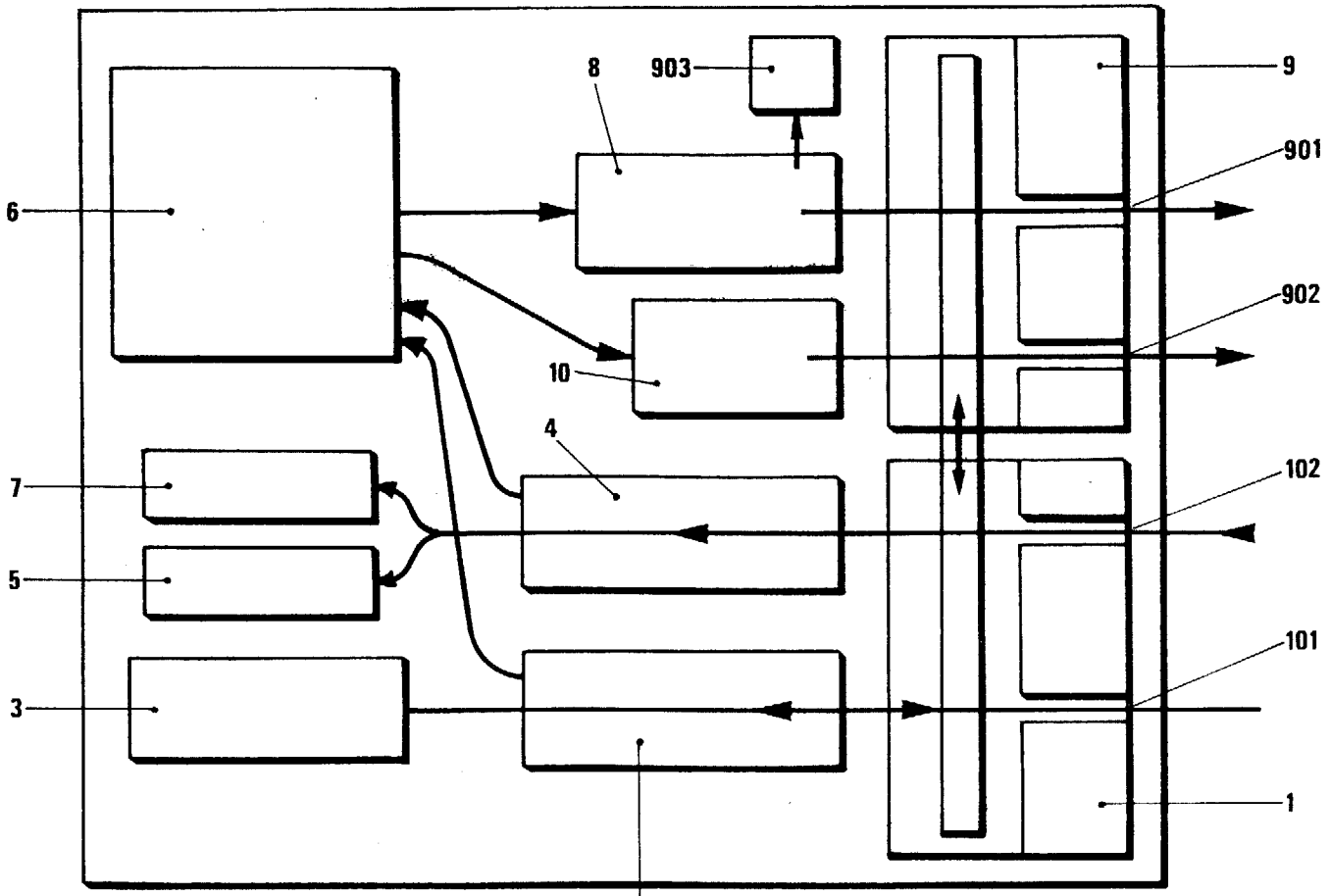
FIG. 1 is a block diagram of the bank note dispensing apparatus according to the invention.

The bank note dispensing apparatus, according to the invention, is represented schematically in FIG. 1. This dispensing apparatus is designed to dispense the number of notes requested on presentation of an identity card and a cheque.

The bank identity card is introduced into the inlet area 1 which transmits the card to the card verification area 2; this latter verifies, first of all, that the card has been introduced correctly, that its shape is the right one, and that it is authentic. All cards on which the device 2 has detected a falsified or erroneous element, is sent under control from this device 2 to the card retention device 3. However, if the card is found to be authentic, it stays in the verification device until the end of the note dispensing operation, whereupon it is returned to the user.

After the card has been verified the user introduces his cheque (not shown) into the input area, using for that purpose the opening 101, such introduction being authorized as the result of the verification of the card in the device 2. This cheque can be refused if the introduction has been made incorrectly. Conversely, if a cheque has been introduced correctly (orientation), it is transmitted to a cheque verifying device 4. This device verifies, on one hand, the authenticity of the cheque, and on the other, the agreement of the elements of comparison on the identity card which is still in the verification device 2.

If the device 4 detects an absence of agreement, the cheque is sent to the cheque confiscation device 5. The card also is confiscated and the note dispensing apparatus, described later, is prevented from dispensing any notes. On the other hand, if the cheque has been recognized as authentic, and coinciding with the information on the card, the latter itself having been recognised as authentic by the device 2, the verification device 4 sends the relevant information to the logic control means 6 and the used cheque is cancelled (by marking, punching, etc . . . ) and then sent to the used cheque storing device 7.

The logic control means 6 which also has received information concerning the card, supplied by the card verification device 2, actuates the note dispenser 8 so that the latter supplies the notes requested in the output area 9. In the case where, for any reason whatever, the apparatus remains inactive, of if the identity card is retained in the retention device 3, because the data on it is incorrect, or the apparatus has read them or interpreted them badly, the user receives a ticket provided by the ticket dispenser 10.

The user obtains the ticket at the output point 902 which will enable him to regularize the situation (confiscation of cheque or card), with his bank, resulting from the malfunctioning of the apparatus.

In summary, the object of the apparatus for dispensing bank notes is to verify whether the user has introduced an authentic card and cheque, non falsified, into the apparatus, and that the identification data on the cheque corresponds to those on the card.

The verification of this correspondence is an important element of the invention. Thus there may be users (members of the same company or family, etc. . . . ) who have the same interchangeable cheques but different bank identity cards (equivalent to an authorisation).

A number of means are available for verifying an identity card (bank identity card) as being authentic and which can be used separately or in combination.

Its geometric dimensions can be verified. This requires the identity card to be manufactured with precision, as regards fitness, length of the diagonal, etc . . . These various data are coded and recorded on a magnetic track provided on the card. The apparatus then proceeds to compare the set geometric data with those on the card.

Another means of verification makes use of luminescence. A certain number of luminescent signs (phosphor paint) are provided in precise places. The areas are illuminated for a short instant and, after the illumination has been stopped the signals emitted are examined and compared with the values recorded on the card or contained in the memory provided in the apparatus.

A third alternative consists in inscribing data on the card with the aid of radio-isotopes. The three means described above are suitable particularly for an identity card, that is to say, an item which has to serve repeatedly and, because of this, justifies more accurate manufacture.

The problems which arise in verifying the authenticity of cheques and identifying them are different because a cheque, by its nature, must only serve for one single payment.

To verify the authenticity of the cheque, it is possible to examine its colour, by illuminating the cheque being examined with a defined source of light and analysing the reflected rays. The integration of the reflected rays provides information on the cheque. This information is compared with the data stored in the memory of the apparatus. It is possible also to carry out a verification of luminescence or measuring $\alpha$-ray radiation.

A fourth alternative consists in putting inscriptions or marks on the cheque with the aid of a metallic lacquer corresponding to a given geometry or given inscriptions. The verification carried out is analogous to that indicated above.

The various means indicated enable also the falsification of a cheque to be detected. Thus, if just one of the necessary identification data is wrong or changed, the apparatus confiscates the cheque.

Advantage may also be taken of the particular nature of the paper from which cheques are made in order to detect erasures and other falsifications. The paper can be treated chemically before hand to make falsifications more apparent to the apparatus.

Lastly, in general, agreement between the data on the cheque and those on the identity card are verified. In case of non coincidence, the machine confiscates both items.

After this verification, the apparatus frees the note dispenser 8 which supplies the requested number of bank notes.

The cheque remains in the apparatus and constitutes the accounting document for automatic processing.

On the other hand, the bank identity card is returned to the user; this identity card can also be used for other purposes within the framework of banking activities.

Figure 2:
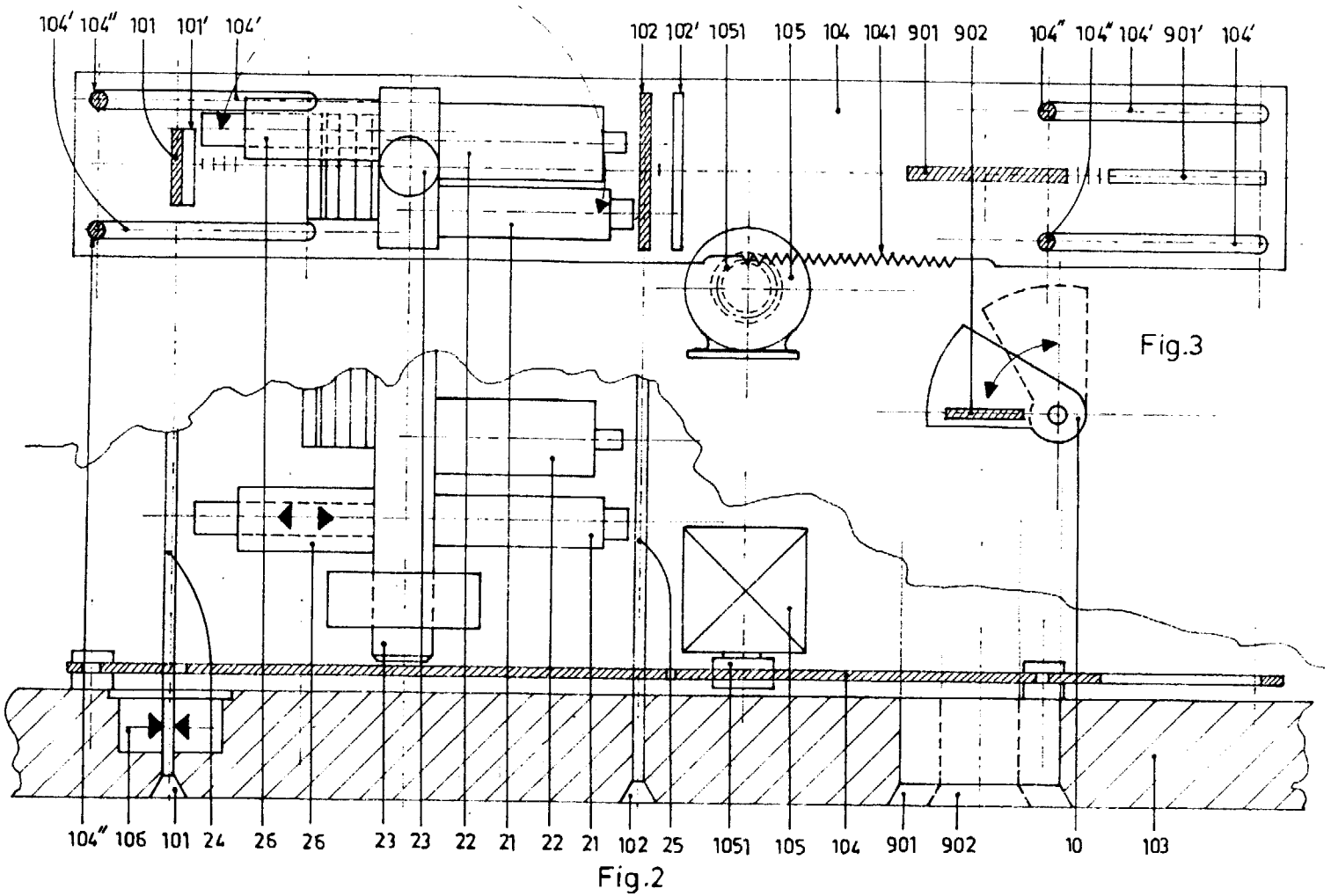
FIG. 2 is a plan view partially sectioned, of a detail of the introduction and the reception area.

More particularly, as shown in FIG. 2, the input area 1 and the output area 9 are constructed in an analogous fashion. They consist respectively of an inlet for identity cards 101, of an inlet for cheques 102, an outlet for bank notes 901 and an outlet for tickets 902. The wall between these two areas consists of a shield 103 or other means for protection. This shield is provided with vertical slots which constitute the inlets 101, 102, or horizontal slots constituting the outlets 901, 902. Behind the shield 103 is a means for obturation 104, such as a cursor controlled by a motor 105. The cursor has windows which are clearly illustrated in FIG. 3, and which correspond to the inlets 101, 102, 901, which are distributed over the cursor in a manner such that whatever its position, only one window coincides with one of the openings 101, 102, 901. The motor 105, for example, is a step-by-step motor, provided with a toothed pinion 1051 cooperating with a rack-bar 1041 provided on the cursor 104 (see FIG. 3) and is controlled by the logic control means 6.

An independent obturation means 10 has been provided for the outlet 102 as described later with reference to FIG. 3.

FIG. 2 also shows a detail of the card verification device 2 and of the cheque verification device 4. In fact, according to the feature of the invention, the two devices 2, 4 are joined together into one device, fulfilling both functions. As indicated above, the verification of a card and of a cheque consists essentially in verifying the presence and the position of certain reference points. To this end, the combined verification device 2, 4 consists of reading heads 21, 22 in a selected number, integral with the shaft 23 mounted rotatively. It is possible also to bring the reading heads 21, 22 either to opposite the location 24 of the identity card or else to opposite the location 25 of the cheque. In each case, the information read is sent to the logic control means 6, which stores it in the memory and compares it by known electronic means.

For the sake of security, the input area 1 comprises a means for the preliminary verification 106 of the identity cards, immediately after they have been introduced. This may be a device for verifying the geometry of the card (thickness, height, width) in order to reject immediately any card which obviously does not belong to the card system of the apparatus. It is possible also to use a card provided with a spot, or a metallic card, or another means which causes the apparatus to operate by the actuation of a contactor, etc . . .

Lastly, the cheque verification device 4 comprises a means which can cancel the cheques which have been paid by the apparatus. This, for example, can be a punch or a marker 26, which also is integral with the shaft 23 and which can be brought to opposite this cheque located in the location 25, by the rotation of the shaft 23.

According to a feature, the marker is preferably in the location of a striker (21, 22) to enable the cheque to be cancelled or punched at an important location which constitutes a reference point.

However, other forms of cancellation are possible.

FIG. 3, which is a schematic front view of the apparatus shows in particular the cursor 104, guided in a horizontal translatory movement by the slots 104 which receive the guide studs 104''. The step-by-step motor 105 is seen, and of which the toothed pinion 1051 engages in the rack-bar 1041.

The slots 101, 102, 901, 902 in this FIG. 3 are shown as black areas to show their position with respect to the slots 101', 102', 901' of the cursor 104.

This front view also shows the obturator 104 for the ticket outlet slot 902.

Figures 4, 4A:
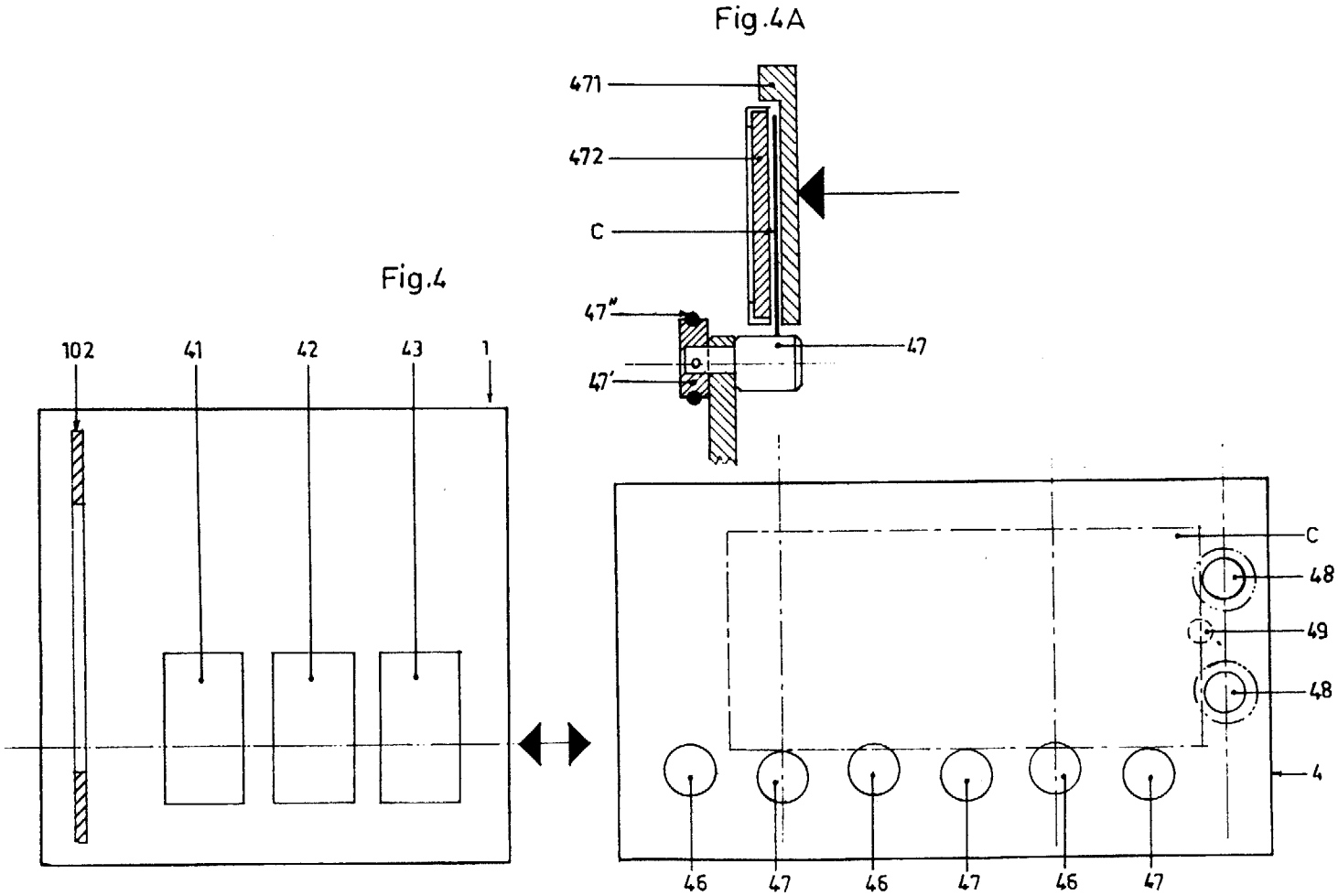
FIG. 4 is a side view of the path and the positioning of the identity card or of the cheque introduced into the apparatus.
FIG. 4A is a vertical section along A—A of FIG. 4.

FIG. 4 shows schematically the various operations carried out on a cheque in the reception area 1 and the verification device 4.

According to FIG. 4, in the input area 1, after the cheque C intended to be read magnetically has been received, it is first of all cancelled by the head 4, then magnetised on the head 42 and finally read on the head 43. The cursor 104 is not shown in this FIG. 4.

Consideration was given above to the processing of a magnetic inscription. However, other means of reading, such as optical means can be used. This applies not only to accounting inscriptions, required for the identification of the cheque, but also to various reference inscriptions which enable the authenticity of the cheque or of the identity card to be verified.

After the reading operation has been completed, the transfer device 44 sends the cheque to the verification device 4 as such. This device, a side view of which is shown schematically in FIG. 4, consists of transport rollers 46 and positioning rollers 47. The transport rollers 46 are movable rotatively and upward. On the other hand, the positioning rollers which must ensure that the cheque C is positioned accurately, are movable rotatively about a fixed axle. The cheque C comes to bear against the rollers or abutments 48.

The above description (FIG. 4) is valid both for cheques and for bank identity cards. Lastly, in general, the card and the cheque C are introduced and processed in a vertical position and not in a prone position, which ensures that they are positioned accurately.

In the mode of construction shown in FIG. 4, transport rollers 46 and positioning rollers 47 alternate. When the cheque reaches the abutments 48, a detector, such as a photoelectric cell 49 causes the transport rollers 46 to be lowered so that the cheque presses on the positioning rollers 47. The rollers 47 are driven rotatively so that they press the cheque C firmly against the abutments 48. After the positioning operation has been completed, the reference marks on the cheque are read.

FIG. 4A, which shows a vertical section of the verification device 4, shows the positioning rollers 47 driven by a pulley 47' and a belt or a chain 47''. The cheque C, which rests on the rollers 47, is compressed between the two plates 471 and 472 which position it accurately. It is only when the cheque is pressed that the reading operation can take place. In order to allow such reading, the plates 471 and 472 are transparent or perforated.

Figure 5A:
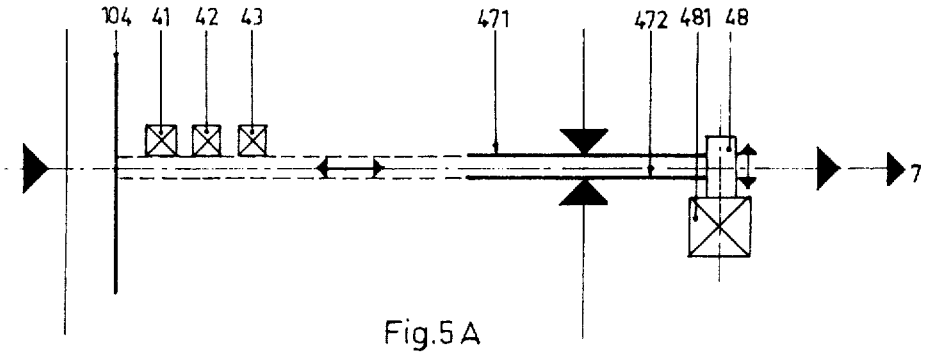
FIGS. 5A, 5B, 5C are schematic plan views of the three construction variants of the cheque output channels.
Figure 5B:
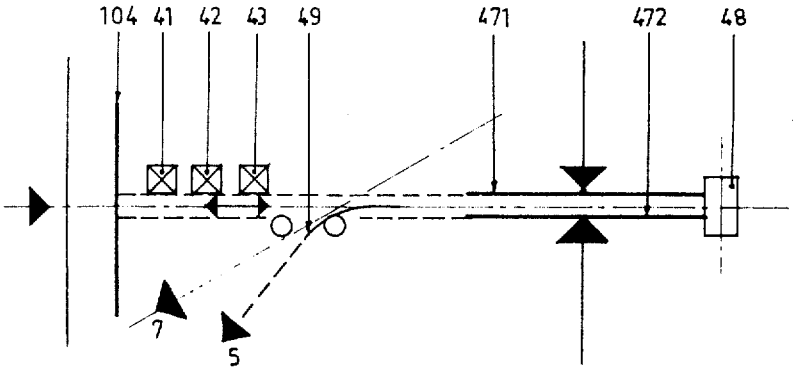
Figure 5C:
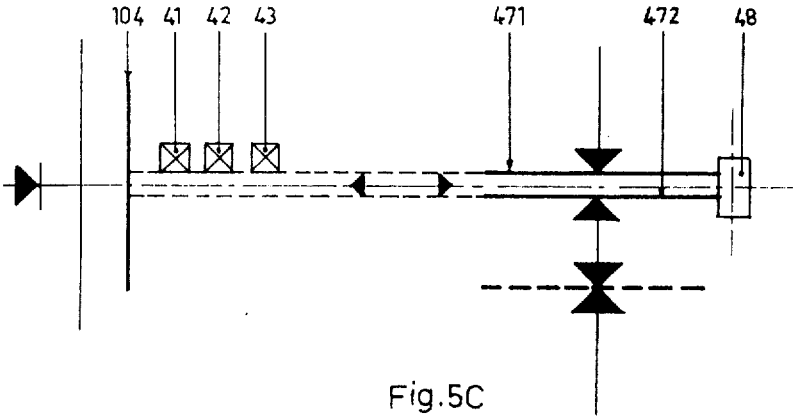

After the cheque has been read, it is removed with the aid of one of the devices shown in FIGS. 5A, 5B, 5C.

According to a first outlet device, the end abutments 48 are retractable. They are carried by the axles which are integral with the core of the electro-magnet 481. After the reading operation, the electro-magnet 481 causes the abutments 48 to retract and the transport rollers 46 to lift. These remove the cheque from the verification device 4 in order to bring it to the used cheque reception area 7.

The second variant (FIG. 5B) consists in providing abutments 48, fixed in position, and to actuate the rollers 46 into a reverse movement in order to remove the cheque C, in order to make the cheque C come back and bring it to a switching point 49 which sends it either to the area 5 or to the area 7, according to the logic control means 6.

FIG. 5C represents a third variant. In this case, after the cheque has been read in the verification area, it is transferred in a lateral direction and then removed. This transfer, for example, is effected by means of a movable compression plate 472 provided with a means of suction for holding the cheque. This plate is displaced in the direction of the arrows shown in FIG. 5C. In this variant, as in FIG. 5C, the end abutments 48 are fixed.

After verifying and recording the data entered on the cheque, the electronic control means 6 frees the note dispenser 8.

Such a note dispenser is shown schematically in FIGS. 6A–6E. A variant of this device is shown in FIGS. 7A–7D.

According to the first mode of construction the note dispenser which is intended to dispense either notes of one denomination, or notes of several denominations, consists of a number of components such as are described hereafter:

A component of the note dispenser consists of a receptacle 81 receiving a flat stack of notes 82. A counter-weight 83 presses on these notes. A level detector 84 verifies that the receptacle 81 contains a sufficient number of notes before accepting the cheque introduced into the apparatus.

The base of the receptacle 81 comprises an orifice 85 delimited by two edges 851, 852, forming a window 853. The dispenser also comprises an extractor 86 such as a suction head. Following a cyclic movement this extractor 86 is brought against the bottom note in the stack 82 (FIG. 6A). The suction means is been actuated, which fixes the extracted 86 onto the bottom note 82' of the stack 82 (FIG. 6B).

The extractor 86 is then displaced in a translatory movement in the direction indicated by the arrow in FIG. 6C. A loop 82' then forms and detaches the note immediately below the one above it in the stack 82. Thus, the right hand edge (FIG. 6C) of the note 82' is in abutment. This movement, on one hand, forms the loop 82'a which separates the note from the preceding note and, on the other hand, frees the left-hand edge 82'b. It is thus in this way, by a descending movement of the extractor 86, that a note is extracted from the stack (FIG. 6D). The note (FIG. 6E) passes in front of a checking device 87, such as a light barrier, and is then sent either to the note outlet 901 or to the note retention means 903. This light barrier enables not only the passage of a note or of no note to be counted, but also the simultaneous passage of several notes adhering to one another. In this case, the light signal obtained based on transparency can be used by the electronic control means 6 which causes the notes to be carried to the note retention means 903 and to initiate a new extraction operation until the dispenser has effected it correctly whereupon if necessary the electronic control means stops the operation of the dispensing apparatus.

Figure 7A:
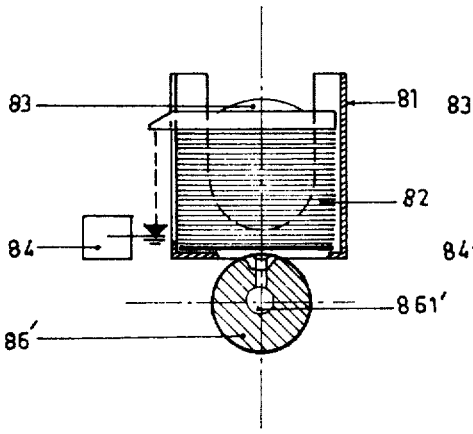
FIGS. 7A–7D show various operating phases of a variant of construction of the note dispenser, according to the invention.
Figure 7B:
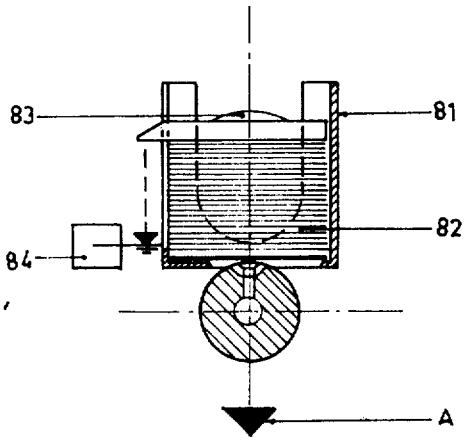
Figure 7C:
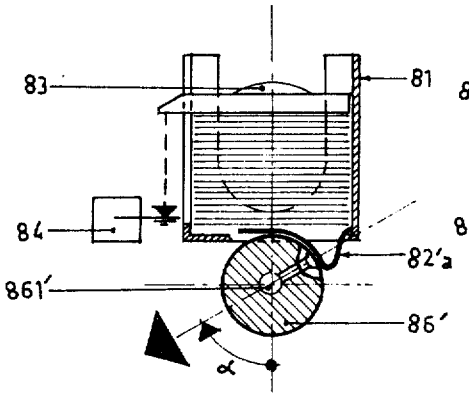
Figure 7D:
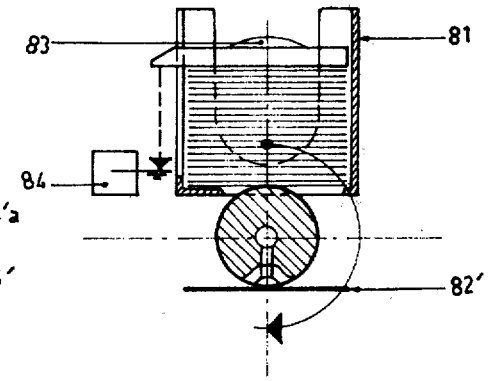

The variant of the note dispenser is shown in FIGS. 7A–7D. According to this variant, the extractor 86 consists of a turning extractor 86', for example a short cylinder or a revolving body provided with a suction means. This extractor turns about a fixed axle 861'. In the first plate, as before, a vacuum is created in the suction head of the extractor 86' (arrow A), in order to fix the first note on the head. By a rotation $\alpha$ of the extractor 86' about its axle 861', which is executed without translation, a translatory movement of the note is obtained which results in the formation of the loop 82'a, followed by the extraction of the note 82' (FIG. 7D). As a result of this, the note is transported as described, for example, in FIG. 6E.

For the sake of security and simplification, it is possible to place a certain number of notes in a cassette in the note dispenser. The person responsible for the apparatus then replaces an empty cassette with a full cassette. Such cassettes can be made so that they are interference-proof.

The above apparatus operates sequentially. The user waits for the result of each operation (introduction of card, introduction of cheque, verification of the cheque), which is given to him either by visual display or by means of a sound signal so that he can carry out the next operation, in case this is required.

Lastly, it is also of value to record all the operations carried out by the apparatus on a control magnetic tape which enables an operation to be verified at any moment.

It is obvious that the invention is not limited to the example of its embodiment herein above described and illustrated and on the basis of which other variants can be envisaged without departing from the scope of the invention.

What is claimed is:

1. Apparatus for dispensing bank notes on presentation of a bank identity card and a cheque on which the amount corresponds to the value of the notes requested, said apparatus comprising:

a bank note dispenser, means for verifying the authenticity of the bank identity card introduced into the apparatus by the user, means for verifying the authenticity of a cheque introduced into the apparatus by the user, means for verifying agreement between the identification marks on the bank identity card and the identification marks on the cheque, a logic control means receiving the signals supplied respectively by the means for verifying the authenticity of the identity card, the means for verifying the authenticity of the cheque and the means for verifying agreement, said logic control means controlling the note dispenser in accordance with the information it has received, in which the means for verifying the authenticity of the bank identity card and the means for verifying the authenticity of the bank cheque respectively include a positioning device for positioning the identity card and the cheque in vertical position, edgewise, for examination, and in which the means for verifying the card and the means for verifying the cheque comprise a common means for reading comprising reading heads integral with a horizontal rotary shaft whereby the reading heads may be presented alternatively to the card and the cheque in order to verify the cheque and the card separately.

2. Apparatus according to claim 1 in which said cheque positioning device comprises horizontal positioning rollers on which rests the lower edge of the cheque to be verified and processed, and a vertical abutment for the leading end of the cheque moved thereagainst by the positioning rollers.

3. Apparatus according to claim 2 including transfer means for transferring the cheque from the positioning device, said transfer means comprising means to lift the cheque.

4. Apparatus according to claim 1 wherein said rotary shaft is equipped with means to cancel the cheque.

5. Apparatus according to claim in which the bank note dispenser receives the notes in a stack between side plates, the dispenser having an opening defined by ledges which support opposite ends of the lowermost note, a suction extractor engageable with the exposed side of the note to be extracted, and means for translating the extractor laterally and axially of the dispenser opening whereby the extractable note on lateral movement of the extractor is caused to buckle against a side plate, forming a loop in the note, whereafter the buckled note is withdrawn through said opening.

6. Apparatus according to claim 5 wherein the extractor is moveable along one path to buckle the note and moveable along a separate path perpendicular thereto to extract the note.

7. Apparatus according to claim 5 wherein the extractor is rotary.

8. Apparatus for dispensing bank notes on presentation of a bank identity card and a cheque on which the amount corresponds to the value of the notes requested, said apparatus comprising:

means to position the card and separate means spaced therefrom to position the check for verification, a bank note dispenser, means for verifying the authenticity of the bank identity card introduced into the apparatus by the user, means for verifying the authenticity of a cheque introduced into the apparatus by the user, means for verifying agreement between the identification marks on the bank identity card and the identification marks on the cheque, a logic control means receiving the signals supplied respectively by the means for verifying the authenticity of the identity card, the means for verifying the authenticity of the cheque and the means for verifying agreement, said logic control means controlling the note dispenser in accordance with the information it has received, said means for verifying the authenticity of the bank identity card and the means for verifying the authenticity of the bank cheque being reading heads on a rotary shaft disposed between said positioning means whereby the shaft on rotation alternately scans the card and check to be read for verification.

9. Apparatus according to claim 8 wherein the bank note dispenser includes a receptacle having side plates for stacking the notes and spaced ledges presenting an opening which exposes the note to be extracted while supporting opposite ends of the note to be extracted, a suction extractor engageable with the underside of the note to be extracted, and means for translating the suction extractor both laterally and axially of said opening thereby first to buckle the note, forming a loop therein, and then to withdraw the note exposed to the extractor.

10. Apparatus for dispensing bank notes on presentation of a bank identity card and a cheque on which the amount corresponds to the value of the notes requested, said apparatus comprising:

a bank note dispenser, means for verifying the authenticity of the bank identity card introduced into the apparatus by the user, means for verifying the authenticity of a cheque introduced into the apparatus by the user, means for verifying agreement between the identification marks on the bank identity card and the identification marks on the cheque, a logic control means receiving the signals supplied respectively by the means for verifying the authenticity of the identity card, the means for verifying the authenticity of the cheque and the means for verifying agreement, said logic control means controlling the note dispenser in accordance with the information it has received, the means for verifying the authenticity of the bank identity card and the means for verifying the authenticity of the bank cheque respectively,, including a positioning device for positioning the identity card and the cheque in vertical position, edgewise, for examination, said cheque positioning device comprising horizontal positioning rollers on which rests the lower edge of the cheque to be verified and processed, and a vertical abutment for the leading end of the cheque moved thereagainst by the positioning rollers, and transfer means for transferring the cheque from the cheque positioning device, said transfer means comprising means to lift the cheque.

* * * * *